July 7, 1970   O. B. CRUSE   3,519,312

CONTROL VALVE

Filed March 4, 1969

INVENTOR
OLIVER B. CRUSE
BY
Joseph E. Papin

United States Patent Office 3,519,312
Patented July 7, 1970

3,519,312
CONTROL VALVE
Oliver B. Cruse, Florissant, Mo., assignor to Wagner Electric Corporation, Newark, N.J., a corporation of Delaware
Filed Mar. 4, 1969, Ser. No. 804,241
Int. Cl. B60t 15/02
U.S. Cl. 303—13          32 Claims

ABSTRACT OF THE DISCLOSURE

A control valve having resiliently urged means movable therein to predeterminately limit the amount of fluid pressure applied from a source thereof to an emergency portion of a spring set brake actuator, and manually movable means for venting the applied fluid pressure to the atmosphere.

---

The present invention pertainst o control valves and in particular to those utilized in a modulated fluid pressure systems for controlling a spring set brake actuator.

In the past, a push-pull valve was utilized in the fluid pressure system connected between a source of fluid pressure and an operator-controlled modulated application valve for controlling the application of fluid pressure from said source to a fluid pressure consumer or other motor, such as for instance, the emergency portion of a spring set brake actuator or chamber. The push-pull valve was of a type well known to the art movable between one position for applying fluid pressure supplied thereto from the source to the modulating application valve and therethrough to the emergency portion of the spring set brake chamber and another position for isolating said source and venting the applied fluid pressure to the atmosphere. When the push-pull valve was in its one position, the modulating application valve connected the emergency portion of the spring set brake chamber in pressure fluid communication with the source, and the fluid pressure so applied to said spring set brake chamber disabled or contained the force of the spring driven member thereof. The modulating application valve was selectively operable in response to operator control thereof to interrupt pressure fluid communication between said source and said spring set brake chamber and controllably meter the applied fluid pressure from the emergency portion of said spring set brake chamber to the atmosphere. When the applied fluid pressure in the emergency portion of said spring set brake chamber was so metered to atmosphere and reduced below the predetermined value necessary to contain the force of the spring driven member thereof, said force was then operable to drive said spring driven member in a direction to controllably energize a brake or friction device operably connected therewith. One of the disadvantageous or undesirable features of such past control or push-pull valves was that it applied the maximum fluid pressure available at the source to the emergency portion of the spring set brake chamber, and the magnitude of the maximum applied fluid pressure was appreciably greater than the actual predetermined value thereof necessary to contain the force of the spring driven member thereof; therefore, upon selective actuation of the modulating valve, it was necessary to meter the maximum applied fluid pressure in the emergency portion of said spring set brake chamber to atmosphere in order to reduce the magnitude thereof down to at least the predetermined value at which said spring driven member became operable to energize the friction device. In connection with the foregoing, another disadvantageous or undesirable feature was that the necessary reduction of the magnitude of the maximum applied fluid pressure down to the predetermined value for actuating the spring driven member deleteriously affected, i.e., lengthened, the response time of the modulating application valve. Another disadvantageous feature was that an undersirable, rather large volume of air was exhausted to atmosphere upon actuation of the modulating applicatinon valve. And still another disadvantageous or undesirable feature was that the sealing members of the spring set brake chamber were responsive to the load of the maximum applied fluid pressure.

The principal object of the present invention is to provide a control or push-pull valve operable in a modulated fluid pressure system for controlling spring set brake chambers which overcomes the aforementioned undesirable and disadvantageous features, as well as others, and this and other objects and advantageous features of the present invention will become apparent hereinafter.

Briefly, the present invention includes a control valve having means normally effecting the application therethrough of fluid pressure supplied thereto and movable in response to a predetermined supplied and applied fluid pressure toward a position isolating the applied fluid pressure from the supplied fluid pressure, and selectively operable means for venting the applied fluid pressure to the atmosphere.

In the drawings which illustrate an embodiment of the invention and wherein like numerals refer to like parts wherever they occur:

Figure 1:
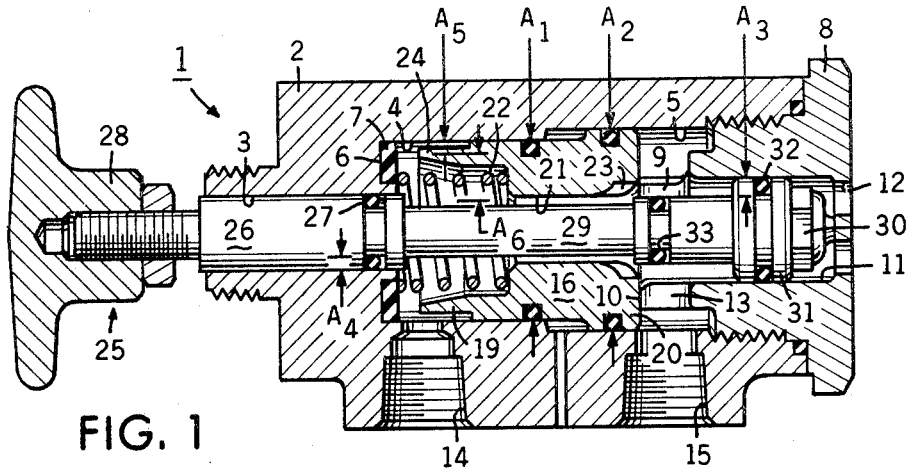
FIG. 1 is a sectional view showing a control valve embodying the present invention in cross-section.

Referring now to the drawings and in particular to FIG. 1, a control or push-pull valve 1 is provided with a housing 2 having a bore 3 therein aligned with stepped counterbores 4, 5, and a recessed annular shoulder 6 is provided on said housing at the juncture of said bore 3 and counterbore 4 against which a valve seat 7 is positioned. A closure member or end plug 8 is threadedly received in the open end of the counterbore 5 having an annular extension or stop member 9 with an abutment or free end 10 extending substantially coaxially into said counterbore. Another bore 11 is axially provided in the closure member 8 having one end thereof extending through the extension free end thereof in pressure fluid communication with the counterbore 5. The other end or end wall of the closure member bore 11 is defined by the closure member 8, and a plurality of exhause ports 12 are provided in said closure member connecting said bore with the atmosphere. A plurality of cross-passages or slots 13 are provided through the extension free end 10 intersecting with the bore 10, and the housing 2 is also provided with inlet and outlet ports 14, 15 respectively intersecting with the counterbore 4 adjacent to the leftward end thereof and the counterbore 5 adjacent to the mid-portion thereof, said inlet and outlet ports being adapted for connection with a fluid pressure source and a fluid pressure consumer or motor, respectively.

A stepped metering piston 16 is slidably received in the counterbores 4, 5 between the inlet and outlet ports 14, 15, and peripheral seats 17, 18 are carried in said piston in respective sealing engagement with the counterbores 4, 5, said seals 17, 18 defining opposed effective differential areas $A_1$, $A_2$ on said piston subjected to the fluid pressure at the inlet and outlet ports 14, 15, respectively. It should be noted that area $A_2$ is predeterminately greater than area $A_1$. Opposed end portions 19, 20 are also provided on the piston 16, and a stepped passage 21 is provided through said piston between said opposed end portions normally connecting the inlet and outlet ports 14, 15 in pressure fluid communication. A spring 22 is biased between the seal 7 and said piston urging the rightward end 20 thereof into abutting engagement with the extension free end 10 of the closure member 8. The rightward end 23 of the piston passage 21 defines a valve seat, and an annular valve member or element 24 is provided on the leftward end of the piston 16 about the passage 21 for sealing engagement with the valve seat 7. A selectively operable member, indicated generally at 25, includes a push rod member 26 slidably received in the housing bore 3 having a peripheral seal 27 engaged with said housing bore and a force receiving portion 28 extending exteriorly of the housing. The push rod 26 includes an extension portion 29 which extends coaxially through the piston passage 21 and the housing counterbores 4, 5 having a rightward end 30 extending into the closure member bore 11 into fixed engagement with a piston 31. The piston 31 is provided with a peripheral seal 32 thereon and is slidably received in said closure member bore normally closing said closure member bore to interrupt pressure fluid communication therethrough between the exhaust and outlet ports 12, 15. Another sealing element or valve member 33 is carried on the push rod extension 29 for sealing engagement with the piston valve seat 23, as discussed hereinafter. An annular effective area $A_3$ is provided on the piston 31 for selective subjection to the fluid pressure at the outlet port 15 and the atmosphere, and another annular effective area $A_4$ is provided on the push rod 26 in opposed relation with said area $A_3$ for selective subjection to the fluid pressures at the inlet and outlet ports 14, 15, said area $A_4$ being predeterminately greater than area $A_3$.

Figure 2:
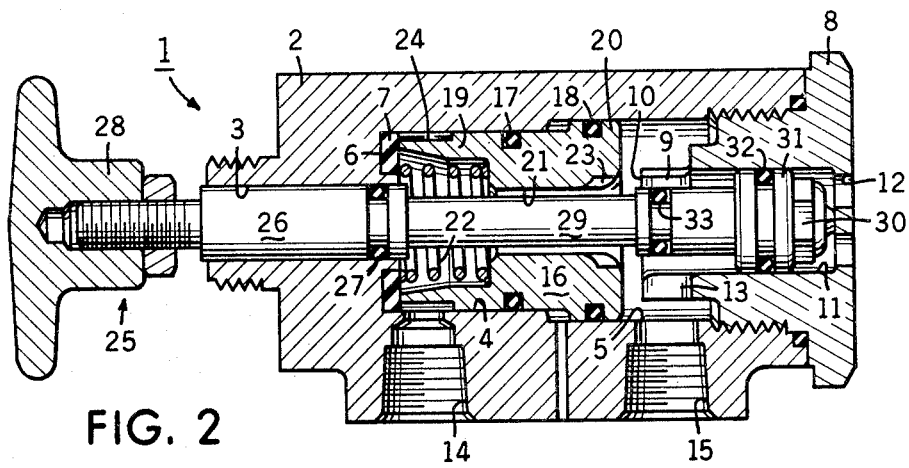
FIG. 2 is a sectional view illustrating the control valve of FIG. 1 in its applied position in cross-section.

In the operation with the metering piston 16 and the push rod 26 in their normal positions, as shown in FIG. 1 and as described hereinbefore, pressure fluid flows from the inlet port 14 into the housing counterbore 4 and therefrom through the passage 21 of said metering piston and the closure member bore and cross-passages 11, 13 to the housing counterbore 5 and the outlet port 15. The fluid pressure so established at the outlet port 15 acts on the opposed effective areas $A_3$, $A_4$ of the push rod 26 to establish a differential holding force $F_1$ urging said push rod toward its normal or "in" position, as shown. When the fluid pressure at the inlet and outlet ports 14, 15 acting on the areas $A_1$, $A_2$ attains a predetermined value, the metering piston 16 is moved leftwardly in the housing counterbores 4, 5 against the compressive force of the metering spring 22 toward an isolating position, as shown in FIG. 2, sealably engaging the valve member 24 with the housing valve seat 7 and closing the metering piston passage 21 to isolate the fluid pressure at the inlet port 14 from that at the outlet port 15. Thereafter, the fluid pressure at the inlet port, being connected with a fluid pressure source or reservoir (not shown), as mentioned hereinbefore, will rise to a magnitude in excess of the predetermined value. With the metering piston 16 in its isolating position, it should be noted that the area $A_1$ on the leftward end portion 19 of said metering piston is divided into an annular metering area portion $A_5$ and another annular area portion $A_6$. The metering area portion $A_5$ is defined between the housing counterbore 4 and the sealing engagement of the metering piston valve member 24 with the housing valve seat 7 being subjected to the fluid pressure at the inlet port 14, and the other area portion $A_6$ is defined between the metering piston valve member and said housing valve seat being subjected to the fluid pressure at said outlet port.

In the event that the fluid pressure at the outlet port 15 is reduced to a value less than the predetermined value, such as for instance, upon the actuation of the fluid pressure consumer (not shown) adapted for connection with the outlet port 15, as previously mentioned, the fluid pressure at the inlet port 14 acting on the metering area portion $A_5$ and assisted by the compressive force of the metering spring 22 urges the metering piston 16 rightwardly in the housing bore and counterbore 4, 5 against the force of the reduced fluid pressure at said inlet port acting on the area $A_2$ and the area portion $A_6$ toward a metering position disengaging the metering piston valve member 24 from the housing valve seat 7 to establish metered pressure fluid communication between said inlet and outlet ports and effect a metered increase in the fluid pressure at said outlet port to re-establish the magnitude thereof to the predetermined value. When the magnitude of the fluid pressure at the outlet port 15 is re-established to the predetermined value, it again acts on the area $A_2$ and the area portion $A_6$ to move the metering piston 16 leftwardly to its isolating position against the compressive force of the metering spring 22 and the fluid pressure at the inlet port 14 acting on the metering area portion $A_5$ to re-engage the metering piston valve member 24 with the housing valve seat 7.

Figure 3:
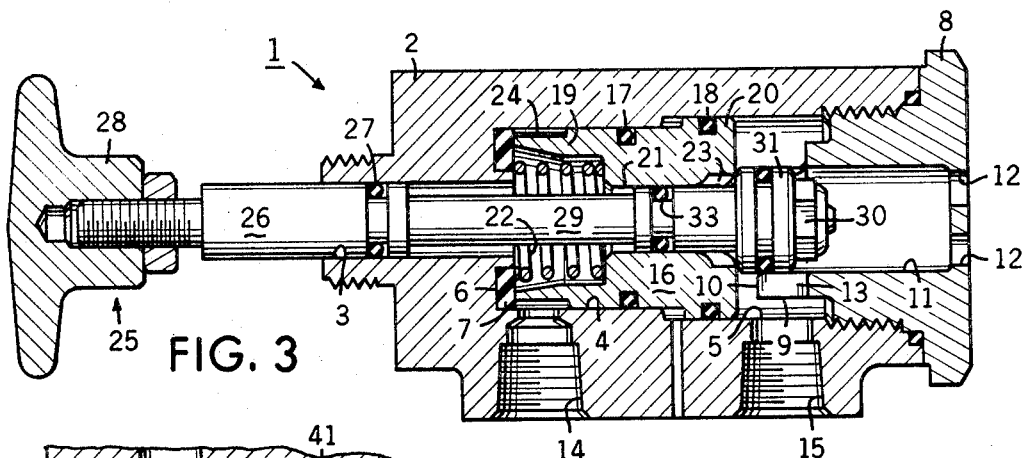
FIG. 3 is another sectional view showing the control valve of FIG. 1 in its venting position in cross-section.

In the event the operator wishes to vent the fluid pressure at the outlet port 15 to the atmosphere, a manual force is applied in the leftward direction on the force receiving end 28 of the push rod 26 to move said push rod leftwardly in the housing bore 3 and the closure member bore 11 against the holding force $F_1$ toward a venting position, as shown in FIG. 3. Initially, the leftward movement of the push rod 26 sealably engages the valve element 33 thereof with the metering piston valve seat 23 closing the passage 21, and further leftward movement of said push rod concertedly moves the piston 31 leftwardly in the closure member bore 11 toward the venting position uncovering the closure member cross-passages 13 to establish pressure fluid communication therethrough between the exhaust and outlet ports 12, 15. When the push rod 26 is in its venting position, the fluid pressure at the outlet port 15 flows therefrom through the housing counterbore 5 and the closure member cross-passages and bore 13, 11 to the exhaust port 12 and the atmosphere. In this manner, the exhaustion of the fluid pressure at the outlet port 15 to the atmosphere eliminates the holding force $F_1$ on the push rod 26, the compressive force of the metering spring 22 and the fluid pressure at the inlet port 14 acting on the effective area $A_1$ of the metering piston 16 urges said metering piston rightwardly in the housing counterbores 4, 5 toward its normal position with the rightward end portion 20 thereof in abutting engagement with the closure member abutment 10. With the push rod 26 in its leftward or venting position, the fluid pressure at the inlet port 14 acts on the area $A_4$ to establish another holding force $F_2$ to maintain said push rod in its leftward or vented position when the operator applied manual force thereon is eliminated.

Figure 4:
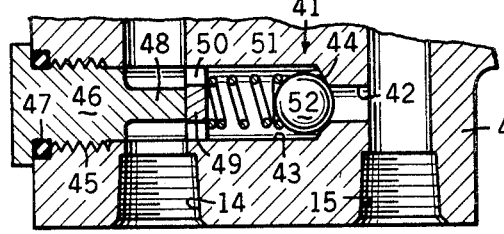
FIG. 4 is a sectional view of an embodiment of the control valve of FIG. 1.

Referring now to FIG. 4, the control valve 1 is provided with a housing extension 40 to accommodate a uni-directional flow valve mechanism, indicated generally at 41. Stepped passages 42, 43 are provided in the housing extension 40 having a shoulder 44 therebetween defining a valve seat, and the smaller stepped passage 42 intersects with the outlet port 15 while the larger stepped passage 43 intersects with the inlet port 14. The leftward end of the larger stepped passage 43 is threaded at 45 to cooperatively receive a plug or closure member 46, and a seal 47 is engaged between said member and the housing extension 40. The plug 46 is provided with a reduced portion or extension 48 which extends coaxially into the larger stepped passage 43 having a free end or abutment 49 in seating engagement with a preforated or finger-type spring retainer 50. A valve spring 51 of negligible compressive force is engaged between the retainer 50 and a check valve member or ball 52 normally urging said check valve member into engagement with the valve seat 44. Of course, the check valve member 52 is operative to permit pressure fluid flow through the stepped passages 42, 43 only in the direction from the outlet port 15 to the inlet port 14; therefore, in the event of the failure of the fluid pressure at said inlet port, said check valve member is displaced against the spring 51 from engagement with the seat 44 to effect depletion of the fluid pressure at said outlet port independently of the functioning of the metering piston 26 and the push rod 26.

From the foregoing, it is now apparent that a control valve meeting the objects and advantageous features set forth hereinbefore, as well as other objects and advantageous features, is provided and that changes as to the precise configurations, shapes and details of the construction set forth in the disclosure by way of illustration may be made by those with ordinary skills in the art without departing from the spirit of the invention.

The embodiments of the invention in which an exclusive property or privilege is claimed are defined as follows:

1. A control valve comprising a housing, resiliently urged means movable in said housing for controlling the application through said housing of fluid pressure supplied thereto, a pair of opposed effective areas on said resiliently urged means for respective subjection to the supplied and applied fluid pressures, said resiliently urged means being movable against its own force in response to the supplied and applied fluid pressures of a predetermined value respectively acting on said opposed areas toward a position in said housing isolating the supplied fluid pressure from the applied fluid pressure, selectively operable means movable in said housing in response to an applied force in one direction toward a position for venting the applied fluid pressure to the atmosphere and also movable in response to another applied force in the opposite direction toward another position for interrupting communication between the applied fluid pressure and the atmosphere, and other means for sealing engagement between said resiliently urged means and said selectively operable means to maintain the supplied fluid pressure isolated from the applied fluid pressure upon the applied force movement in the one direction of said selectively operable means toward its venting position.

2. A control valve according to claim 1, wherein one of said opposed areas is predeterminately greater than the other of said opposed areas, the applied fluid pressure acting on said one opposed area and the supplied fluid pressure acting on said other opposed area.

3. A control valve according to claim 1, comprising a metering area on said resiliently urged means subjected to the supplied fluid pressure when said resiliently urged means is in its isolating position, said resiliently urged means being movable in response to the isolated supplied fluid pressure acting on said metering area and assisted by its own force toward a metering position in said housing effecting metered pressure fluid communication between the supplied and applied fluid pressures to re-establish the magnitude of the applied fluid pressure to the predetermined value in the event of a reduction in the magnitude of the applied fluid pressure to a value less than the predetermined value.

4. A control valve according to claim 1, wherein said other area includes a metering area portion subjected to the supplied fluid pressure in excess of the predetermined value and another area portion subjected to the applied fluid pressure when said resiliently urged means is in its isolating position, said resiliently urged means being movable in response to the isolated supplied fluid pressure in excess of the predetermined value acting on said metering area portion and assisted by said resiliently urged means own force toward a metering position in said housing establishing metered pressure fluid communication between the supplied fluid pressure and the applied fluid pressure to effect a metered increase of the applied fluid pressure to the predetermined value in the event the applied fluid pressure acting on said other area and said other area portion is reduced to a value less than the predetermined value.

5. A control valve according to claim 1, comprising a valve seat in said housing, said resiliently urged means being movable toward its isolating position into engagement with said valve seat to isolate the supplied fluid pressure from the applied fluid pressure.

6. A control valve according to claim 5, comprising means on said resiliently urged means defining valve means for engagement with said valve seat, said valve means being movable into engagement with said valve seat to isolate the supplied fluid pressure upon the movement of said resiliently urged means into its isolating position.

7. A control valve according to claim 1, wherein said resiliently urged means and selectively operable means define with said housing a pressure fluid flow passage for the application therethrough of the supplied fluid pressure, said flow passage being closed upon the movement of said resiliently urged means to its isolating position and the applied force movement in the one direction of said selectively operable means toward its venting position initially effecting the sealing engagement of said other means to close said flow passage maintaining the supplied and applied fluid pressures isolated in respective one and other portions thereof and thereafter establishing pressure fluid communication between said other flow passage portion and the atmosphere to vent the applied fluid pressure.

8. A control valve according to claim 7, comprising means in said housing defining exhaust passage means for connection in pressure fluid communication with said other flow passage portion, said selectively operable means normally closing said exhaust passage means and being movable in response to the applied force in the one direction toward its venting position to open said exhaust passage means and establish pressure fluid communication between said exhaust passage means and said other flow passage portion.

9. A control valve according to claim 1, comprising a third area on said selectively operable means subjected to the applied fluid pressure and establishing a holding force urging said selectively operable means in the opposite direction toward its interrupting position.

10. A control valve according to claim 1, comprising a third area on said selectively operable means subjected to the isolated supplied fluid pressure upon the applied force movement in the one direction of said selectively operable means toward its venting position and establishing a holding force urging said selectively operable means in the one direction toward its venting position.

11. A control valve according to claim 1, comprising opposed differential areas on said selectively operable means for subjection to the applied fluid pressure when said selectively operable means is in its interrupting position, the applied fluid pressure acting on said opposed differential areas to establish a differential force urging said selectively operable means in the opposite direction toward its interrupting position, one of said opposed differential areas being subjected to the atmosphere upon the applied force movement in the one direction of said selectively operable means toward its venting position to eliminate said differential force, and the other of said opposed differential areas being subjected to the isolated supplied fluid pressure when said selectively operable means is in its venting position establishing another force urging said selectively operable means in the opposite direction toward its venting position.

12. A control valve according to claim 11, wherein said one opposed differential area is predeterminately greater than said other opposed differential area.

13. A control valve according to claim 1, wherein said resiliently urged means and selectively operable means define with said housing a pressure fluid flow passage for the application therethrough of the supplied fluid pressure, a valve seat in said flow passage, abutment means on said housing, said resiliently urged means including piston means having opposed end portions respectively defining said opposed areas, passage means in said piston means between said opposed end portions thereof and defining a portion of said flow passage, valve means in said piston means about said passage means for engagement with said valve seat, resilient means engaged with said piston means normally urging said piston means toward engagement with said abutment means and urging said valve means toward an open position in said flow passage disengaged from said valve seat, said piston means being movable against the force of said resilient means in response to the supplied and applied fluid pressures of the predetermined value acting on said opposed areas to engage said valve means with said valve seat closing said flow passage and isolating the supplied fluid pressure from the applied fluid pressure, and another valve seat on said piston means about said passage means for sealing engagement with said other means, said other means including another valve member on said selectively operable means movable into engagement with said other valve seat to close said passage means upon the movement of said selectively operable means in the one direction toward its venting position.

14. A control valve according to claim 13, including exhaust passage means in said housing for connection with a portion of said flow passage in which the applied fluid pressure is isolated, said selectively operable means including other piston means movable in said exhaust passage means and normally closing said exhaust passage means in its interrupting position to interrupt pressure fluid communication between said flow passage portion and the atmosphere, extension means on said selectively operable means extending toward said first named piston means, and said other valve means being on said extension means, said other piston means being initially movable in response to the applied force in the one direction toward its venting position to engage said other valve means with said other valve seat closing said passage means to isolate the supplied fluid pressure in another portion of said flow passage and thereafter further movable toward a position opening said exhaust passage means and connecting said exhaust passage means in pressure fluid communication with said first named portion of said flow passage to vent the applied fluid pressure to the atmosphere.

15. A control valve comprising a housing having inlet, outlet and exhaust ports therein, resiliently urged means movable in said housing for controlling pressure fluid communication between said inlet and outlet ports, a pair of opposed effective areas on said resiliently urged means for respective subjection to the fluid pressure at said inlet and outlet ports, said resiliently urged means being movable against its own force from a normal position in said housing establishing pressure fluid communication between said inlet and outlet ports in response to fluid pressure at said inlet and outlet ports of a predetermined value respectively acting on said opposed means toward another position in said housing interrupting pressure fluid communication between said inlet and outlet ports, other means movable in said housing for controlling pressure fluid communication between said outlet and exhaust ports, said other means being movable in response to an applied force from a normal position interrupting pressure fluid communication between said outlet and exhaust ports toward a venting position establishing pressure fluid communication between said outlet and exhaust ports, and sealing means for sealing engagement between said resiliently urged means and other means to interrupt pressure fluid communication between said inlet and outlet ports upon the applied force movement of said other means toward its venting position.

16. A control valve according to claim 15, wherein one of said opposed areas subjected to the fluid pressure at said outlet port is predeterminately greater than the other of said areas.

17. A control valve according to claim 15, comprising a metering area on said resiliently urged means subjected to the fluid pressure at said inlet port when said resiliently urged means is in its other position, said resiliently urged means being movable in response to the fluid pressure at said inlet port acting on said metering area and assisted by its own force upon the reduction of the magnitude of the fluid pressure at said outlet port to a value less than the predetermined value toward a metering position in said housing effecting metered pressure fluid communication between said inlet and outlet ports to re-establish the magnitude of the fluid pressure at said outlet port to the predetermined value.

18. A control valve according to claim 15, wherein one of said opposed areas includes a metering area portion and another area portion, said metering area portion being subjected to the fluid pressure at said inlet port and said other area portion and the other of said areas being respectively subjected to the fluid pressure at said outlet port when said resiliently urged means and other means are in their respective other and normal positions, said resiliently urged means being movable in response to the fluid pressure at said inlet port acting on said metering area portion and assisted by its own force against the fluid pressure at said outlet port acting on said other area portion and said other area toward a metering position in said housing establishing metered pressure fluid communication between said inlet and outlet ports to effect a metered increase of the fluid pressure at said outlet port to the predetermined value in the event of a reduction thereof to a value less than the predetermined value.

19. A control valve according to claim 15, comprising a valve seat in said housing, said resiliently urged means being movable into engagement with said valve seat in its other position to interrupt pressure fluid communication between said inlet and outlet ports.

20. A control valve according to claim 19, comprising valve means on said resiliently urged means for engagement with said valve seat, said valve means being movable into engagement with said valve seat to interrupt pressure fluid communication between said inlet and outlet ports upon the movement of said resiliently urged means to its other position.

21. A control valve according to claim 15, wherein said resiliently urged means and other means define with said housing a pressure fluid flow passage between said inlet and outlet ports, said flow passage being open when said resiliently urged means and other means are in their respective normal positions and said flow passage being closed upon the movement of said resiliently urged means toward its other position.

22. A control valve according to claim 15, wherein said resiliently urged means and said other means define with said housing an exhaust passage between said outlet and exhaust ports, said exhaust passage being closed when said other means is in its normal position and said exhaust passage being opened upon the applied force movement of said other means toward its venting position.

23. A control valve according to claim 15, wherein said resiliently urged means and said other means define with said housing a pressure fluid flow passage between said inlet and outlet ports and an exhaust passage between said outlet and exhaust ports, said flow passage being open and said exhaust passage being closed when said resiliently urged means and other means are in their respective normal positions and said flow passage being closed upon the movement of said resiliently urged means toward its other position, and said sealing means being engaged between said resiliently urged means and other means to close said flow passage and said exhaust passage being thereafter opened upon the applied force movement of said other means toward its venting position.

24. A control valve according to claim 15, comprising a third area on said other means subjected to the fluid pressure at said outlet port when said other means is in its normal position, the fluid pressure at said outlet port acting on said third area to establish a holding force urging said other means toward its normal position and opposing the applied force movement thereof toward its venting position.

25. A control valve according to claim 15, comprising a third area on said other means for subjection to the fluid pressure at said inlet port when said other means is in its venting position, the fluid pressure at said inlet port acting on said third area to establish a holding force opposing movement of said other means from its venting position when said other means is in its venting position.

26. A control valve according to claim 15, comprising opposed differential areas on said other means for subjection to the fluid pressure at said outlet port when said other means is in its normal position, the fluid pressure at said outlet port acting on said opposed differential areas to establish a differential force urging said other means toward its normal position and opposing the applied force movement thereof toward its venting position, one of said opposed differential areas being subjected to the atmosphere upon the applied force movement of said other means toward its venting position to eliminate said differential force, and the fluid pressure at said inlet port acting on the other of said opposed differential areas to establish another force opposing movement of said other means from its venting position upon the applied force movement of said other means into its venting position.

27. A control valve according to claim 26, wherein said one opposed differential area is predeterminately greater than the other thereof.

28. A control valve according to claim 15, wherein said resiliently urged means includes piston means movable in said housing between said inlet and outlet ports and having opposed portions respectively defining said opposed areas, passage means in said piston means between said opposed portions, valve means in said piston means about said passage means, and resilient means urging said piston means toward its normal position, abutment means on said housing for engagement with said piston means and defining the normal position thereof, and a valve on said housing for engagement with said valve means, said piston means being movable from its normal position against the force of said resilient means in response to the fluid pressure at said inlet and outlet ports of the predetermined value respectively acting on said opposed areas toward its other position to engage said valve means with said valve seat closing said passage means and interrupting pressure fluid communication between said inlet and outlet ports when said other means is in its normal position.

29. A control valve according to claim 28, wherein said other area includes a metering area portion and another area portion, said metering area portion being subjected to the fluid pressure at said inlet port and said one opposed area and said other area portion being subjected to the fluid pressure at said outlet port when said valve means is engaged with said valve means, said piston means being movable in response to the force of said resilient means and the fluid pressure at said inlet port acting on said metering area portion against the fluid pressure at said outlet port acting on said other area and other area portion when the magnitude of the fluid pressure at said outlet port is reduced below the predetermined value toward a metering position disengaging said valve means from said valve seat to open said passage means and effect a metered increase in the magnitude of the fluid pressure at said outlet port to re-establish the predetermined value thereof.

30. A control valve according to claim 28, wherein said piston means includes a valve seat about said passage means, said other means including other piston means movable in said housing between said outlet and exhaust ports, extension means on said other piston means extending toward said first named piston means and movable in said passage means, and said sealing means being on said extension means for seating engagement with said valve seat, said sealing means being initially engaged with said other valve seat to close said passage means and said piston means thereafter establishing pressure fluid communication between said outlet and exhaust ports upon the applied force movement of said other piston means toward its venting position, and said first named piston means being thereafter movable from its other position disengaging said valve means from said first named valve seat toward its normal position into engagement with said abutment means in response to the force of said resilient means and the fluid pressure at said inlet port acting on said other area when the fluid pressure at said outlet port acting on said one area is vented to said exhaust port.

31. A control valve comprising a housing having a bore therein aligned with a pair of stepped counterbores, an annular shoulder on said housing at the juncture of said bore with one of said counterbores, a closure member connected with said housing defining an end wall of the other of said counterbores and including extension means extending into said other counterbore, a free end on said extension means in said other counterbore defining an abutment, another bore in said closure member having one end connected with the atmosphere and the other end thereof intersecting with said free end, and at least one cross-passage extending through said extension means adjacent to said free end portion thereof between said other bore and said other counterbore, an inlet port in said housing intersecting said one counterbore adjacent to said shoulder, an outlet port in said housing intersecting with said other counterbore adjacent to said closure member, a valve seat in said housing and engaged with said shoulder, a stepped piston slidable in said one and other counterbores between said inlet and outlet ports and having opposed ends, passage means in said piston intersecting with said opposed ends and normally connecting said inlet port in pressure fluid communication with said outlet port, a spring engaged between said valve seat and said piston urging said valve seat into engagement with said shoulder and urging one of said piston opposed ends into engagement with said abutment, a valve member on the other of said piston opposed ends about said passage means for engagement with said valve seat, a portion of said passage means adjacent to said piston one opposed end defining another valve seat, said one and other piston opposed ends defining opposed effective one and other areas for subjection to the fluid pressure at said outlet and inlet ports, respectively, said one area being greater than said other area, said piston being movable against the force of said spring in response to fluid pressure at said outlet and inlet ports of a predetermined value respectively acting on said one and other areas toward a position disengaging said one piston opposed end from said abutment and engaging said valve member with said first named valve seat to close said passage means and interrupt pressure fluid communication between said inlet and outlet ports, said other area including a metering area portion and another area portion respectively subjected to the fluid pressure at said inlet and outlet ports when said valve member is engaged with said valve seat, said piston being movable in response to the fluid pressure at said inlet port acting on said metering area portion and the force of said spring against the fluid pressure at said outlet port acting on said one area and said other area portion in the event of the reduction of the magnitude of the fluid pressure at said outlet port to a value less than the predetermined value toward a metering position disengaging said valve member from said valve seat to establish metered pressure fluid communication between said inlet and outlet ports and effect a metered increase in fluid pressure at said outlet port to re-establish the reduced magnitude thereof to the predetermined value, another piston slidable in said other bore and normally urged toward a position closing said bore and interrupting pressure fluid communication therethrough between said outlet port and the atmosphere, push rod means extending substantially coaxially through said passage means and said one and other counterbores having one end extending into said other bore in fixed engagement with said other piston and the other end thereof slidable in said first named bore, said other end of said push rod means including a force receiving portion extending exteriorly of said housing, another valve member on said push rod means for engagement with said other valve seat and normally disengaged therefrom when said other piston means is in its position closing said other bore, said push rod being responsive to an applied force on the force receiving end thereof to initially move said other valve member into engagement with said other valve seat closing said passage means and thereafter concertedly move said other piston to a venting position in said other bore connecting said cross-passage in pressure fluid communication between said outlet port and the atmosphere through said other bore, and said first named piston being movable in response to the force of said spring and the fluid pressure at said inlet port acting on said other area to disengage said first named valve member from said first named valve seat and re-engage said piston one opposed end with said abutment when the fluid pressure at said outlet port acting on said one area is vented to the atmosphere.

32. A control valve according to claim 15, comprising passage means in said housing between said inlet and outlet ports, and check valve means in said passage means normally urged toward a closed position therein, said check valve means being movable toward an open position in said passage means to establish pressure fluid flow therethrough only from said outlet port to said inlet port in the event of the failure of the fluid pressure at said inlet port.

References Cited
UNITED STATES PATENTS

| | | | |
|---|---|---|---|
| 3,168,353 | 2/1965 | Horowitz | 303—13 |
| 3,366,142 | 1/1968 | Bueller | 303—13 X |
| 3,403,699 | 10/1968 | Fites | 303—13 X |

MILTON BUCHLER, Primary Examiner

JOHN J. McLAUGHLIN, Jr., Assistant Examiner

U.S. Cl. X.R.

137—625.67; 303—50, 71